(12) United States Patent
Beck et al.

(10) Patent No.: US 8,541,136 B2
(45) Date of Patent: Sep. 24, 2013

(54) MIXED METAL OLIVINE ELECTRODE MATERIALS FOR LITHIUM ION BATTERIES

(75) Inventors: Larry Beck, Ann Arbor, MI (US); Anthony E. Pullen, Belmont, MA (US); Chuanjing Xu, Ann Arbor, MI (US); Liya Wang, Ann Arbor, MI (US); Phillip Sholtes, Grosse Ile, MI (US)

(73) Assignee: A123 Systems LLC, Livonia, MI (US)

( * ) Notice: Subject to any disclaimer, the term of this patent is extended or adjusted under 35 U.S.C. 154(b) by 1178 days.

(21) Appl. No.: 12/357,008

(22) Filed: Jan. 21, 2009

(65) Prior Publication Data

US 2009/0186277 A1    Jul. 23, 2009

Related U.S. Application Data

(60) Provisional application No. 61/021,844, filed on Jan. 17, 2008.

(51) Int. Cl.
| | |
|---|---|
| *H01M 4/00* | (2006.01) |
| *H01M 4/50* | (2010.01) |
| *H01M 4/52* | (2010.01) |
| *H01M 4/58* | (2010.01) |
| *H01M 4/88* | (2006.01) |

(52) U.S. Cl.
USPC ........ 429/221; 429/182.1; 429/223; 429/224; 429/231.5; 429/231.6; 429/231.95

(58) Field of Classification Search
USPC ............. 429/221, 182.1, 223, 224, 231.5, 429/231.8, 231.95
See application file for complete search history.

(56) References Cited

U.S. PATENT DOCUMENTS

| 3,070,423 A | 12/1962 | Alexander et al. |
|---|---|---|
| 3,407,034 A | 10/1968 | Bennetch et al. |
| 4,144,163 A | 3/1979 | Kolm |
| 4,374,109 A | 2/1983 | Ruszala et al. |

(Continued)

FOREIGN PATENT DOCUMENTS

| CN | 1105047 A | 7/1995 |
|---|---|---|
| CN | 1794497 A | 6/2006 |

(Continued)

OTHER PUBLICATIONS

International Search Report issued for PCT/US2009/031552, dated Sep. 1, 2009 (2 pages).

(Continued)

*Primary Examiner* — Timothy Vanoy
(74) *Attorney, Agent, or Firm* — Wilmer Cutler Pickering Hale and Dorr LLP (57) ABSTRACT

A positive electrode material is provided including an electroactive material having one or more phases comprising lithium (Li), an electroactive metal (M), and phosphate ($PO_4$), wherein in the fully lithiated state, the overall composition has a ratio of Li:M ranging from greater than about 1.0 to about 1.3, a ratio of ($PO_4$):M ranging from about 1.0 to about 1.132, M is one or more metals selected from the group consisting of Cr, Mn, Fe, Co, and Ni, and at least one phase includes an olivine lithium electroactive metal phosphate. In some instances, a composite cathode material including an electroactive olivine transition metal phosphate and a lithium and phosphate rich secondary phase is disclosed for use in a lithium ion battery.

27 Claims, 3 Drawing Sheets

(56) References Cited

U.S. PATENT DOCUMENTS

| | | | |
|---|---|---|---|
| 5,030,285 A | 7/1991 | Vallvey et al. | |
| 5,053,297 A | 10/1991 | Yamahira et al. | |
| 5,278,000 A | 1/1994 | Huang et al. | |
| 5,691,083 A | 11/1997 | Bolster | |
| 5,910,382 A | 6/1999 | Goodenough et al. | |
| 6,514,640 B1 | 2/2003 | Armand et al. | |
| 6,528,003 B1 | 3/2003 | Sano et al. | |
| 6,599,662 B1 | 7/2003 | Chiang et al. | |
| 6,656,635 B2 | 12/2003 | Okawa et al. | |
| 6,723,470 B2 | 4/2004 | Barker et al. | |
| 6,730,281 B2 | 5/2004 | Barker | |
| 6,749,967 B2 | 6/2004 | Li et al. | |
| 6,787,232 B1 | 9/2004 | Chiang et al. | |
| 6,815,122 B2 | 11/2004 | Barker et al. | |
| 6,855,273 B2 | 2/2005 | Ravet et al. | |
| 6,884,544 B2 | 4/2005 | Barker et al. | |
| 7,001,690 B2 | 2/2006 | Barker et al. | |
| 7,026,072 B2 | 4/2006 | Barker et al. | |
| 7,190,171 B2 | 3/2007 | Kawakami et al. | |
| 7,233,128 B2 | 6/2007 | Brost et al. | |
| 7,282,300 B2 | 10/2007 | Goh et al. | |
| 7,524,529 B2 | 4/2009 | Yang | |
| 7,842,420 B2 | 11/2010 | Wixom et al. | |
| 7,988,879 B2 * | 8/2011 | Park et al. | 252/182.1 |
| 8,187,735 B2 * | 5/2012 | Chiang et al. | 429/50 |
| 2002/0004169 A1 | 1/2002 | Yamada et al. | |
| 2002/0039687 A1 * | 4/2002 | Barker et al. | 429/231.95 |
| 2003/0064290 A1 | 4/2003 | Li | |
| 2004/0005265 A1 | 1/2004 | Chiang et al. | |
| 2004/0018430 A1 | 1/2004 | Holman et al. | |
| 2004/0033360 A1 | 2/2004 | Armand et al. | |
| 2004/0086445 A1 | 5/2004 | Armand et al. | |
| 2004/0175614 A1 | 9/2004 | Wurm | |
| 2004/0257045 A1 | 12/2004 | Sada et al. | |
| 2005/0186476 A1 | 8/2005 | Barker et al. | |
| 2005/0233219 A1 | 10/2005 | Gozdz et al. | |
| 2005/0266303 A1 | 12/2005 | Kadouchi et al. | |
| 2006/0093919 A1 | 5/2006 | Wixom et al. | |
| 2006/0127750 A1 | 6/2006 | Okada et al. | |
| 2006/0127767 A1 | 6/2006 | Gauthier et al. | |
| 2007/0015055 A1 | 1/2007 | Lee et al. | |
| 2008/0138709 A1 | 6/2008 | Hatta et al. | |
| 2008/0274210 A1 | 11/2008 | Chan et al. | |
| 2009/0039307 A1 | 2/2009 | Nakaoka et al. | |
| 2009/0123813 A1 | 5/2009 | Chiang et al. | |
| 2009/0186277 A1 | 7/2009 | Beck et al. | |
| 2010/0028777 A1 * | 2/2010 | Ueda et al. | 429/221 |
| 2010/0178562 A1 * | 7/2010 | Exnar et al. | 429/221 |
| 2010/0183924 A1 | 7/2010 | Song et al. | |
| 2011/0052988 A1 * | 3/2011 | Beck et al. | 429/221 |
| 2011/0068295 A1 | 3/2011 | Beck et al. | |
| 2011/0068298 A1 | 3/2011 | Wixom et al. | |
| 2012/0021407 A1 | 1/2012 | Haj-Ahmad | |

FOREIGN PATENT DOCUMENTS

| | | |
|---|---|---|
| CN | 101172595 A | 5/2008 |
| CN | 101462704 A | 6/2009 |
| CN | 101481104 A | 7/2009 |
| CN | 101659406 A | 3/2010 |
| GB | 1162711 A | 8/1969 |
| JP | 11021114 A | 1/1999 |
| JP | 2003292309 A | 10/2003 |
| JP | 2004359538 A | 12/2004 |
| JP | 2007128723 A | 5/2007 |
| KR | 10-2004-0073505 | 8/2004 |
| KR | 10-2004-0111470 | 12/2004 |
| KR | 10-2006-0132576 | 12/2006 |
| SU | 01724570 A1 | 4/1992 |
| WO | WO-0230815 A1 | 4/2002 |
| WO | WO-03056646 A1 | 7/2003 |
| WO | WO-03085757 A1 | 10/2003 |
| WO | WO-2005041327 A1 | 5/2005 |
| WO | WO-2010097341 A1 | 9/2010 |

OTHER PUBLICATIONS

Berbenni, et al., "Thermogravimetry and X-ray Diffraction Study of the Thermal Decomposition Processes in Li2CO3-MnCO3 Mixtures", Journal of Analytical and Applied Pyrolysis, 60:45-62 (2002), 19 pages.

International Search Report and Written Opinion for International Application No. PCT/US10/49480 mailed Feb. 1, 2011, 17 pages.

International Search Report and Written Opinion for International Application No. PCt/US2010/046646 mailed Oct. 18, 2010. 7 pages.

International Search Report and Written Opinion for PCT Application No. PCT/US08/69858 mailed Jan. 20, 2009. 11 pages.

Jang, et al., "Electrochemical Cycling-Induced Spinel Formation in High-Charge-Capacity Orthorhombic LiMnO2", Journal of The Electrochemical Society, 146(9):3217-3223 (1999), 8 pages.

Jang, et al., "Stability of the Monoclinic and Orthorhombic Phases of LiMnO2 with Temperature, Oxygen Partial Pressure, and Al Doping", Solid State Ionics, 130:53-59 (2000), 8 pages.

Lee, et al., "Li2NiO2 as a Novel Cathode Additive for Overdischarge Protection of Li-Ion Batteries", Chem. Matter, 20:5-7 (2008), 4 pages.

Meethong, et al., "Strain Accommodation during Phase Transformations in Olivine-Based Cathodes as a Materials Selection Criterion for High-Power Rechargeable Batteries", Advanced Functional Materials, 17:1115-1123 (2007), 9 pages.

Meethong, Size-Dependent Lithium Miscibility Gap in Nanoscale Li1-xFePO4, Electrochemical and Solid State Letters, 10(5):A134-A138 (2007), 5 pages.

Song, Yanning et al. "New Iron (III) Phosphate Phases: Crystal Structure and Electrochemical and Magnetic Properties." *Inorg. Chem.* Oct. 2002. vol. 41. pp. 5778-5786.

Striebel et al "Comparison of LiFePO4 from Different Sources", Journal of the Electrochemical Society, 152(4) A664-A670 (2005).

Wang et al., "Improving the rate performance of LiFePO4 by Fe-site doping", Electrochimica Acta. vol. 50, No. 14, pp. 2955-2958, May 5, 2005.

Yamada, et al., Phase Diagram of Lix(MNyFE1-y)PO4(0≤x,y≤1), Journal of The Electrochemical Society, 148(10):A1153-A1158 (2001), 7 pages.

Yonemura et al., "Comparative Kinetic Study of Olivine LixMPO4 (M=Fe, Mn)", Journal of Electrochemical Society 151 (9), A1352-A1356 (2004).

\* cited by examiner

MIXED METAL OLIVINE ELECTRODE MATERIALS FOR LITHIUM ION BATTERIES

CROSS-REFERENCE TO RELATED APPLICATION

This application claims the benefit of the filing date of U.S. patent application Ser. No. 61/021,844, filed on Jan. 17, 2008, the contents of which are incorporated by reference herein in its entirety

BACKGROUND

Batteries produce energy from electrochemical reactions. Batteries typically include a positive electrode and a negative electrode; an ionic electrolyte solution that supports the movement of ions back and forth between the two electrodes; and a porous separator that ensures the two electrodes do not touch but allows ions to travel back and forth between the electrodes.

Contemporary portable electronic appliances rely almost exclusively on rechargeable lithium (Li)-ion batteries as the source of power. This has spurred a continuing effort to increase their energy storage capability, power capabilities, cycle life and safety characteristics, and decrease their cost. Lithium-ion battery or lithium ion cell refers to a rechargeable battery having a negative electrode capable of storing a substantial amount of lithium at a lithium chemical potential above that of lithium metal. When a lithium-ion battery is charged, lithium ions travel from the positive electrode to the negative electrode. On discharge, these ions return to the positive electrode releasing energy in the process.

In a typical Li-ion battery, the cell includes metal oxides for the positive electrode (or cathode), carbon/graphite for the negative electrode (or anode), and a lithium salt in an organic solvent for the electrolyte. More recently, lithium metal phosphates have been used as a cathode electroactive material. Lithium iron phosphate is now recognized as a safe and reliable cathode material for secondary batteries. It is a next-generation replacement for the more hazardous lithium cobalt oxide that is currently used in commercial lithium ion batteries.

These Li-ion batteries using lithium iron phosphate (LFP)-based cathode materials are currently found in cordless hand tools and on-board UPS devices. Battery packs have recently been demonstrated for transportation including aviation and rechargeable electric vehicle (REV), plug-in hybrid electric vehicle (PHEV) automobiles and buses.

New battery applications demand continuous improvements in battery discharge rate capabilities and a parallel decrease in charge times.

SUMMARY

In one aspect, a positive electrode material is provided having an overall composition that is rich in lithium (as compared to the stoichiometric composition for an olivine lithium transition metal phosphate).

In one aspect, a positive electrode material is provided having an overall composition that is rich in lithium and phosphate (as compared to the stoichiometric composition for an olivine lithium transition metal phosphate). In one embodiment, the composition includes a lithium and phosphate rich secondary phase.

In one or more embodiments, A positive electrode material is provided including an electroactive material having one or more phases comprising lithium (Li), an electroactive metal (M), and phosphate ($PO_4$), wherein in the fully lithiated state, the overall composition has a ratio of Li:M ranging from greater than about 1.0 to about 1.3, a ratio of ($PO_4$):M ranging from about 1.0 to about 1. 132, M is one or more metals selected from the group consisting of Cr, Mn, Fe, Co, and Ni, and at least one phase includes an olivine lithium electroactive metal phosphate.

In one or more embodiments, the overall composition has a ratio of ($PO_4$):M that is about 1.0 and the ratio of Li:M ranges from greater than about 1.0 to about 1.07.

In one or more embodiments, the overall composition has a ratio of ($PO_4$):M that is about 1.0 and the ratio of Li:M ranges from greater than about 1.0 to about 1.05.

In one or more embodiments, the electroactive material further includes one or more dopant metals (Z) selected from the group consisting of V, Nb, Ti, Al, Mn, Co, Ni, Mg, and Zr.

In some embodiments, the electroactive material comprises up to 5 mol % of the one or more dopant metals, M is Fe, Li:M ranges from about 1.05 to about 1.12, and ($PO_4$):M ranges from about 1.0 to about 1.03.

In some embodiments, the electroactive material comprises up to 5 mol % of the one or more dopant metals, M is Fe, Li:M ranges from about 1.1 to about 1.15, and ($PO_4$):M ranges from about 1.03 to about 1.05.

In some embodiments, the electroactive material comprises up to 5 mol % of the one or more dopant metals, M is Fe, Li:M ranges from about 1.15 to about 1.2, and ($PO_4$):M ranges from about 1.05 to about 1.07.

In some embodiments, the electroactive material comprises up to 5 mol % of the one or more dopant metals, M is Fe, Li:M ranges from about 1.2 to about 1.3, and ($PO_4$):M ranges from about 1.07 to about 1.1.

In one or more embodiments, the one or more dopant metals substitutes one or more of the lithium or electroactive metals in the olivine lithium electroactive metal phosphate.

In some other embodiments, the olivine lithium electroactive metal phosphate has the formula $(Li_{1-x}Z_x)MPO_4$, x ranges from about 0.001 to about 0.05, and $(Li_{1-x}Z_x)$:M ranges from greater than about 1.0 to about 1.3.

In one or more embodiments, the electroactive material includes the olivine lithium electroactive metal phosphate phase and a lithium and phosphate rich secondary phase. In one or more embodiments, the secondary phase comprises lithium phosphate or lithium pyrophosphate.

In one or more embodiments, a composite cathode material provided that includes an electroactive olivine transition metal phosphate phase and a lithium and phosphate rich secondary phase. In one or more embodiments, the secondary phase comprises lithium phosphate or lithium pyrophosphate.

In one or more embodiments, a lithium secondary cell is provided that includes a positive electrode in electronic contact with a positive electrode current collector, said current collector in electrical connection with an external circuit; a negative electrode in electronic contact with a negative electrode current collector, said current collector in electrical connection with an external circuit; a separator positioned between and in ionic contact with the cathode and the anode; and an electrolyte in ionic contact with the positive and negative electrodes; where the positive electrode includes an electroactive material having one or more phases comprising lithium (Li), an electroactive metal (M), and phosphate ($PO_4$), wherein in the fully lithiated state, the overall composition has a ratio of Li:M ranging from greater than about 1.0 to about 1.3, a ratio of ($PO_4$):M ranging from about 1.0 to about 1.132, M is one or more metals selected from the group consisting of Cr, Mn, Fe, Co, and Ni, and at least one phase includes an olivine lithium electroactive metal phosphate. In one or more embodiments, the ratio of Li:M ranges from greater than about 1.0 to about 1.1.

In certain embodiments, the electroaactive material of the lithium secondary cell further includes one or more dopant metals (Z) selected from the group consisting of V, Nb, Ti, Al, Mn, Co, Ni, Mg, and Zr.

In one or more embodiments, the electroactive material includes up to about 5 mol % of the one or more dopant metals. In one aspect, the one or more dopant metals substitutes one or more of the lithium or electroactive metals in the olivine lithium electroactive metal phosphate. For example, the olivine lithium electroactive metal phosphate has the formula $(Li_{1-x}Z_x)MPO_4$, x ranges from about 0.001 to about 0.05, and the ratio of $(Li_{1-x}Z_x)$:M ranges from greater than about 1.0 to about 1.3.

In one or more embodiments, the electroactive material includes the olivine lithium electroactive metal phosphate phase and a lithium and phosphate rich secondary phase. In one or more embodiments, the negative electrode of the lithium secondary cell includes a lithium intercalation compound or a lithium metal alloy. In one aspect, the negative electrode comprises carbon. In another aspect, the negative electrode comprises graphitic carbon. In yet another aspect, the carbon is selected from the group consisting of graphite, spheroidal graphite, mesocarbon microbeads and carbon fibers.

In one or more embodiments, a positive electrode is provided that includes a positive electrode material. The positive electrode material includes an electroactive material having one or more phases comprising lithium (Li), an electroactive metal (M), and phosphate ($PO_4$), wherein in the fully lithiated state, the overall composition has a ratio of Li:M ranging from greater than about 1.0 to about 1.3, a ratio of ($PO_4$):M ranging from about 1.0 to about 1.132, and wherein M is one or more metals selected from the group consisting of Cr, Mn, Fe, Co, and Ni, and wherein at least one phase comprises an olivine lithium electroactive metal phosphate. In certain embodiments, the ratio of Li:M ranges from greater than about 1.0 to about 1.1.

In one or more embodiments, the electroactive material further comprises one or more dopant metals (Z) selected from the group consisting of V, Nb, Ti, Al, Mg, Mn, Co, Ni, and Zr. In one aspect, the electroactive material comprises up to about 5 mol % of the one or more dopant metals. In one aspect, the one or more dopant metals substitutes one or more of the lithium or electroactive metals in the olivine lithium electroactive metal phosphate. For example, the olivine lithium electroactive metal phosphate has the formula $(Li_{1-x}Z_x)MPO_4$, x ranges from about 0.001 to about 0.05, and $(Li_{1-x}Z_x)$:M ranges from greater than about 1.0 to about 1.3.

In one or more embodiments, the electroactive material comprises the olivine lithium electroactive metal phosphate phase and a lithium and phosphate rich secondary phase.

In one or more embodiments, the positive electrode further includes a binder and an electronically conductive material.

While not being bound by any particular mode or theory of operation, the presence of this second phase may contribute to the advantageous use of this composite material as a lithium ion cathode since the lithium and phosphate rich phase enhances the lithium conductivity for the composite material. Furthermore, the existence of the secondary lithium and phosphate rich phase as a partial covering of the core olivine crystal may also be used to impede crystallite sintering and achieve particle size control in the nanometer (<100 nm) range and demonstrate the advantageous properties when used as a cathode material.

BRIEF DESCRIPTION OF THE DRAWING

A more complete appreciation of the present invention and many of its advantages will be understood by reference to the following detailed description when considered in connection with the following drawings, which are presented for the purpose of illustration only are not intended to limit the scope of the appended claims, and in which:

DETAILED DESCRIPTION

In one aspect, the incorporation of a small amount (<10 wt %) of a lithium-rich or lithium and phosphate-rich phase in a positive electrode contributes to higher energy storage capacity for a lithium ion battery. The composite cathode material shows a strong correlation between the presence of a secondary phase rich in lithium and phosphate and high-power performance and excellent reversible capacity retention in a secondary lithium ion battery application. Without being bound by any particular mode of operation, the lithium rich phase may specifically enhance the high-rate (high-power) lithium insertion by forming a layer that contacts the olivine electroactive material of the positive electrode.

Conventional wisdom would suggest that excess lithium is not desirable in a lithium ion battery as it poses a potential safety risk. While a battery system having an insufficient amount of lithium to fully lithiate the anode during charging is not desirable because it may lead to reduced capacity, adding excess lithium is considered problematic as the excess lithium can plate out as lithium metal at the negative electrode, which is typically a form of intercalation carbon. If the amount of lithium removed from the positive electrode material is greater than the capacity for the negative electrode to accommodate, the excess lithium will be deposited, or plated, as metallic lithium on the external surfaces of the carbon particles of the negative electrode. Lithium metal is flammable and increases the risk of fire or thermal runaway in the battery.

Therefore, it has been surprisingly discovered that cathode electroactive materials having an overall composition that is rich in lithium, or that is rich in lithium and phosphate, provide an increase in the overall charge capacity of the lithium, and in particular, at high discharge rates of up to 10C and even up to 50C.

In one aspect, the positive electrode material has an overall composition having an excess amount of lithium and/or phosphate, relative to the electroactive metal M that is normalized to 1.0. A typical olivine lithium electroactive metal phosphate has the general formula $LiMPO_4$, where M is one or more electroactive metals including Cr, Mn, Fe, Co, and Ni, and the stoichiometric ratio of lithium to electroactive metal to phosphate is 1.0:1.0:1.0.

As used herein, "excess lithium" or "lithium rich" refers to the amount of lithium in the overall composition in excess of that needed to form the stoichiometric olivine compound $M^1M^2PO_4$, where $M^1$:$M^2$:$PO_4$ is 1:1:1 (and, e.g., lithium occupies the $M^1$ site and iron occupies the $M^2$ site). As used herein, "excess phosphate" or "phosphate-rich" refers to the amount of phosphate in the overall composition in excess of that needed to form the stoichiometric olivine compound $M^1M^2PO_4$, where $M^1:M^2:PO_4$ is 1:1:1. The excess lithium and excess phosphate in the overall composition need not provide a non-stoichiometric olivine lithium electroactive metal phosphate. Rather, the excess lithium and/or phosphate is present in the overall composition, for example, as secondary phases and the like.

As used herein, "electroactive metal" means a metal that is capable of undergoing an electrochemical reaction within the operating electrochemical potential of cell. By way of further clarification, certain metals are referred to as doping elements (Z) but are not considered as giving rise the majority of the electric storage capacity of the battery material. Specifically the dopant elements are incorporated at very low levels, preferably between 0.1-5% compared to the electrochemically active metal. Without wishing to be bound by theory, most of the dopant metals expressly listed herein have stable oxidation states that may be significantly different from the operational voltages of the electroactive metals (M), and therefore, these dopant metals are not envisioned to directly contribute to the electric storage capacity of the material. Moreover, in certain embodiments, the certain metals may be utilized as electroactive metals and/or dopant metals. For example, in one embodiment where iron is the predominant electroactive metal, other electroactive metals such Co, Ni, Mn, Cr can be utilized as dopant metals when the content is low (e.g., <10% of that of iron). Moreover, since the redox potentials of Co, Ni, Mn and Cr are about at least 0.5V higher than that of iron, such metals would not normally contribute significant electric storage capacity to a battery cell operating at or near the redox plateu for $Fe^{2+} \rightarrow Fe^{3+}$.

Accordingly, as used herein, "olivine structures" or "olivinic structures" can refer to both stoichiometric, non-stoichiometric, and/or doped structures (e.g., lithium/phosphate rich phases).

In one or more embodiments, the positive electrode material has an overall composition of $Li:M:(PO_4)$, where M is one or more metals including Cr, Mn, Fe, Co, and Ni, where the ratio between Li:M ranges from about greater than 1.0 to about 1.30 and the ratio between $(PO_4):M$ ranges from about 1.0 to about 1.14. The positive electrode material may contain greater than about 100% to about 130% of the stoichiometric amount of lithium and up to about 114% of the stoichiometric amount of phosphate. Alternatively, the positive electrode active compositions comprise up to about 30% molar excess of lithium and up to about 14% molar excess of phosphate. Optimal lithium loadings to provide optimal positive electrode capacity may vary dependent on the exact composition of the olivinic lithium iron phosphate-type electroactive material and on the operating discharge rate. Optimal lithium loadings will also depend on the phosphate loading of the composition. The greater the phosphate excess in the positive electrode material, the greater the amount of lithium that is needed to optimize charge capacity.

In one or more embodiments, the positive electrode material has an overall composition of $Li:M:(PO_4)$, where M is one or more metals including Cr, Mn, Fe, Co, and Ni, where the ratio between Li:M ranges from about greater than 1.0 to about 1.07 and the ratio between $(PO_4):M$ is about 1.0. Stated differently, the positive electrode material comprises greater than about 100% to about 107% of the stoichiometric amount of lithium. Alternatively, the cathode active compositions comprises up to about a 7% molar excess of lithium. Optimal lithium loadings to provide optimal positive electrode capacity may vary dependent on the exact composition of the olivinic lithium iron phosphate-type electroactive material and on the operating discharge rate. For example, when the overall composition does not contain excess phosphate, a smaller excess of lithium is required to optimize electrode capacity.

Crystalline $LiFePO_4$ is a good lithium conducting compound. However, it also is an electronic insulator. To improve electronic conductivity, a small dopant of hypervalent (n>3) transition metal can be included in the olivine lithium iron phosphate-based compound, which contributes to the total electronic conductivity of the composite. Conductivity of the doped olivine compounds can be in the range of about $10^{-3}$-$10^{-4}$ S/cm. Additionally, control of the primary olivine crystallite size to <100 nm dimensions has been shown to enhance both lithium transport kinetics and conductivity of lithium iron phosphate type materials. Further details regarding the composition and preparation of these compounds (including both hypervalent transition metal doping and methods achieving olivine particle size control) are found in United States Published Application 2004/0005265, now U.S. Pat. No. 7,338,734, which is incorporated herein in its entirety by reference.

In one or more embodiments, the positive electroactive material having an excess of lithium and/or phosphate can include an olivine structure compound $LiMPO_4$, where M is one or more of electroactive metal Cr, Mn, Fe, Co, and Ni, in which the compound is optionally doped at the Li, M or P-sites. The lithium-electroactive metal-phosphate compound may be optionally doped with a metal, metalloid, or halogen. Deficiencies at the Li-site can be compensated by the addition of a metal or metalloid, and deficiencies at the P-site can be compensated by the addition of a halogen.

As used herein, a "dopant metal" is a metal that can be doped into the crystalline lattice of the electroactive olivine material of the positive electrode composition, but is present at a small concentration (relative to that of the electroactive metal) or has a redox potential significantly different from the electroactive metal so that the dopant metal does not significantly contribute to the electric storage capacity in an electrochemical cell.

In one or more embodiments, the electroactive material has an overall composition that includes lithium (Li), an electroactive metal (M), and phosphate ($PO_4$), where M is Fe and that further includes with up to 5 mol % of one or more dopant metals, such as V, Nb, Ti, Al, Mn, Co, Ni, Mg, and Zr. In some embodiments, Li:M ranges from about 1.05 to about 1.12 and $(PO_4):M$ ranges from about 1.0 to 1.03. In some other embodiments, Li:M ranges from about 1.1 to about 1.15 and $(PO_4):M$ ranges from about 1.03 to 1.05. In some other embodiments, Li:M ranges from about 1.15 to about 1.2 and $(PO_4):M$ ranges from about 1.05 to 1.07. In some other embodiments, Li:M ranges from about 1.2 to about 1.3 and $(PO_4):M$ ranges from about 1.07 to 1.1.

In one or more embodiments, the electroactive material has an overall composition that includes lithium (Li), an electroactive metal (M), and phosphate ($PO_4$), where M is Fe and that further includes up to 5 mol % of one or more dopant metals, such as V, Nb, Ti, Al, Mn, Co, Ni, Mg, and Zr. In some embodiments, Li:M ranges from about 1.05 to about 1.15 and $(PO_4):M$ is about 1.033. In some other embodiments, Li:M ranges from about 1.1 to about 1.15 and $(PO_4):M$ is about 1.045. In some other embodiments, Li:M ranges from about 1.12 to about 1.17 and $(PO_4):M$ is about 1.064. In some other embodiments, Li:M ranges from about 1.2 to about 1.3 and $(PO_4):M$ is about 1.132.

In some embodiments, the positive electroactive material includes a thermally stable, electroactive metal phosphate including two or more electroactive metals. In one or more embodiments, the positive active material includes a doped lithium electroactive metal phosphate having the olivine structure including a metal dopant such as one or more of V, Nb, Ti, Al, Mn, Co, Ni, Mg, and Zr. In one or more embodiments, the positive active material includes a doped lithium electroactive metal phosphate having the olivine structure including up to 10 mol % vanadium, or about 5 mol % vanadium. In some embodiments, the positive active material includes a doped lithium electroactive metal phosphate having the olivine structure and having the formula $(Li_{1-x}Z_x)MPO_4$, where M is one or more of Cr, Mn, Fe, Co, and Ni, and Z is a metal dopant such as one or more of V, Nb, Ti, Al, Mn, Co, Ni, Mg, and Zr, and x ranges from 0.005 to 0.05. In on exemplary embodiment, the electroactive material is $(Li_{1-x}Z_x)MPO_4$, where M is Fe and Z is Nb, Zr or Ti.

When the composition does not contain significant excess of phosphate, the excess lithium in the positive electrode composition can be up to about 7 mol %. In other embodiments, the composition contains 3-5 mol % excess lithium. With increasing amounts of excess phosphate, the amount of lithium used to obtain a composition with optimal charge capacity also increases.

Doping with hypervalent transition metals contributes to the advantageous application of the resulting olivine materials for rechargeable lithium ion battery applications. The advantageous role of the dopant may be several fold and include the increased electronic conductivity of the olivine powder and may limit the sintering of the olivine nanophosphate particles to allow full utilization of the lithium capacity during fast charge/discharge of the battery. However, composite cathode materials based on olivine materials even without electroactive metal doping are contemplated.

the positive electroactive material typically is a multiphase material. In one or more embodiments, the cathode material includes electroactive olivine electroactive metal phosphate phase and a lithium and phosphate rich secondary phase. The secondary phase may include lithium phosphates, e.g., $Li_3PO_4$, or lithium pyrophosphates, e.g., $Li_4(P_2O_7)$. The lithium rich phase may be a lithium pyrophosphate, $Li_x(PO_y)$ phase, where $x \leq 3$ and $y \leq 4$, for example $Li_4(P_2O_7)$ or $Li_2(P_2O_6)$, and the lithium phosphate phase may be partially crystalline or amorphous. The lithium phosphate and/or lithium pyrophosphate secondary phases and/or any other secondary phases that may be present may be electronically and/or ionically conductive. While not being bound by any particular mode or theory of operation, conductive secondary phases may help to improve the overall conductivity of the electrode and the overall rate performance of the cell.

In one or more embodiments, the secondary phases comprises up to about 10 wt % of the composition, so that the specific cation lithium insertion capacity of the primary olivine phase remains high and the electronic conductivity of the composite electrode material is not negatively affected.

The presence of a lithium phosphate rich secondary phase in the lithium iron phosphate type composite cathode may have several advantages. First, $Li_3PO_4$ is known to be a good lithium ion conductor, ca. $10^{-7}$ S/cm. Therefore, the composite cathode materials contain an olivine core (e.g. lithium iron phosphate type) that is in close, intimate contact with the lithium phosphate secondary phase, either $Li_3PO_4$ or an oxygen depleted lithium pyrophosphate phase, $Li_x(PO_y)$, where $x \leq 3$ and $y \leq 4$. In some embodiments, the secondary lithium phosphate phase can at least partially cover or coat by the olivine core material.

The presence of this second phase contributes to the advantageous use of this composite material as a lithium ion cathode since the lithium and phosphate rich phase enhances the lithium conductivity for the composite material. The lithium phosphate rich phase that is prepared in situ during the olivine crystallization may be considered a type of SEI (solid electrolyte interface) that is more traditionally formed during initial charge/discharge of a lithium ion cell. The purpose of the SEI, layer is to facilitate rapid ion insertion and protect the lithium insertion material from damage during operation of the cell. Both qualities can be attributed to the lithium phosphate phase of the composite olivine electrode material.

An additional and/or alternative role of secondary phase may be as an impediment to sintering of the core olivine (e.g. lithium iron phosphate type) crystallites during the high temperature solid-state synthesis procedure. Particle size control in the nanometer regime enables fast lithium diffusion for the olivine cathodes. The presence of a secondary phase that at least partially covers the core olivine crystallites prevents close contact at grain boundaries of aggregates of olivine nanophosphate particles and prevents the sintering of these aggregates into larger (>100 nm) olivine single crystals. This can give a significant advantage for high power applications of lithium ion batteries and contribute to excellent high rate cathode capacities (at 10C or up to 50C) for the composite cathode materials.

The amount and composition of the secondary lithium and phosphate rich phase in the positive electrode material can contribute to its properties in the positive electrode. Some lithium phosphates, such as trilithium phosphate, crystalline $Li_3PO_4$, are electronically insulating. Therefore, any composite with a significant fraction (e.g. >10 wt %) of the lithium phosphate may result in a higher resistance (impedance) for the composite electrode. This in turn may result in lower than optimal reversible capacities especially at fast charge and discharge rates. Therefore, it may be important to control the fraction of the secondary lithium phosphate phase to an optimal loading condition to achieve maximum performance from the battery cell.

Additionally the extent to which the major starting precursors (e.g., iron phosphate dihydrate and lithium carbonate) are intimately mixed can contribute a non-negligible kinetic limitation to the formation of the expected product ratios. For example, given the possibility of a non-uniformly mixed starting precursor and a sufficiently fast temperature ramp, it may be possible that olivine crystallization may be accompanied by the formation of secondary phases (e.g., $Li_xPO_y$, where $x \leq 3$ and $y \leq 4$), even when the bulk Li/Fe and P/Fe ratios are both less than one in the starting mixture.

The positive electroactive material including a doped olivine electroactive compound can be prepared from starting materials of lithium salts, iron compounds and phosphorous salts including, but not limited to, lithium carbonate, ammonium phosphate and iron oxalate, to which a low additional concentration of dopant metal such as V, Nb, Ti, Al, Mn, Co, Ni, Mg, and Zr have been added, typically as a metal oxide or metal alkoxide. The powder mixture is heated under a low oxygen, e.g., inert, environment at a temperature of 300° C. to 900° C., and for example at a temperature of about 600-700° C. These compounds exhibit increased electronic conductivity at and near room temperature, which is particularly advantageous for their use as lithium storage materials. Further details regarding the composition and preparation of these compounds are found in United States Published Application 2004/0005265, which is incorporated herein in its entirety by reference.

In other embodiments, a process for the synthesis of a lithium electroactive metal phosphate includes the milling and heating a mixture of materials including a lithium source, an iron phosphate and one or more additional dopant metal sources under a reducing atmosphere. Exemplary starting materials include, but are not limited to, lithium carbonate, ferric phosphate, and vanadium oxide. The mixtures are heated at atmospheric pressures under a reducing atmosphere to temperatures of approximately 550-700° C., followed by cooling to room temperature, typically under inert atmospheres. Further details regarding the composition and preparation of these compounds are found in U.S. Pat. No. 7,282, 301, which is incorporated herein in its entirety by reference.

The positive electrode (cathode) is manufactured by applying a semi-liquid paste containing the cathode active compound and conductive additive homogeneously dispersed in a solution of a polymer binder in an appropriate casting solvent to both sides of a current collector foil or grid and drying the applied positive electrode composition. A metallic substrate such as aluminum foil or expanded metal grid is used as the current collector. To improve the adhesion of the active layer to the current collector, an adhesion layer, e.g., thin carbon polymer intercoating, may be applied. The dried layers are calendared to provide layers of uniform thickness and density. The binder used in the electrode may be any suitable binder used as binders for non-aqueous electrolyte cells.

In assembling a lithium ion cell, the negative electrode active material can be any material capable of reversibly taking up lithium. In one embodiment, the negative active material is a carbonaceous material. The carbonaceous material may be non-graphitic or graphitic. A small-particle-size, graphitized natural or synthetic carbon can serve as the negative active material. Although non-graphitic carbon materials or graphite carbon materials may be employed, graphitic materials, such as natural graphite, spheroidal natural graphite, mesocarbon microbeads and carbon fibers, such as mesophase carbon fibers, are preferably used.

A nonaqueous electrolyte is used and includes an appropriate lithium salt dissolved in a nonaqueous solvent. The electrolyte may be infused into a porous separator that spaces apart the positive and negative electrodes. In one or more embodiments, a microporous electronically insulating separator is used.

The positive electrode active material can be incorporated into any battery shape. In fact, other can shapes and sizes, such as cylindrical (jelly roll), square, rectangular (prismatic) coin, button or the like may be used.

EXAMPLE 1

Preparation of a Lithium-ion Secondary Cell Having a Lithium Rich Positive Electrode To prepare LiFePO$_4$, iron oxalate, lithium carbonate, ammonium dihydrogen phosphate (all obtained from Aldrich Chemicals) and niobium oxalate (from Alfa Chemical) were mixed in a plastic milling jar containing stainless steel grinding media and acetone for three days and then dried using a rotary evaporator. Materials are selected to provide the target molar % of each metal in the final product based on the metal assay in Certificate of Analysis provided by the manufacturer. The dried powder was heated in a tube furnace under an inert atmosphere at 600° C. The heating ramp was between 5-10 C/min up to 600° C. and the product was held at the final temperature for 10-20 hours. The finished product was milled and then stored in the absence of water.

The positive electrode slurry was prepared by dissolving 0.0225 g of PVDF-HFP copolymer commercially available as Kynar® 2801 from AtoFina in 1.496 g of acetone and dispersing in the resulting solution a dry mixture of 0.1612 g of doped LiFePO$_4$ prepared as described above and 0.00204 g of conductive carbon (Super P or Ensaco). The paste is homogenized in a vial using a Wig-L-Bug cast on one side of an aluminum foil current collector using a die casting apparatus, dried in an oven to remove the casting solvent and densified using a calendaring apparatus.

Figure 1:
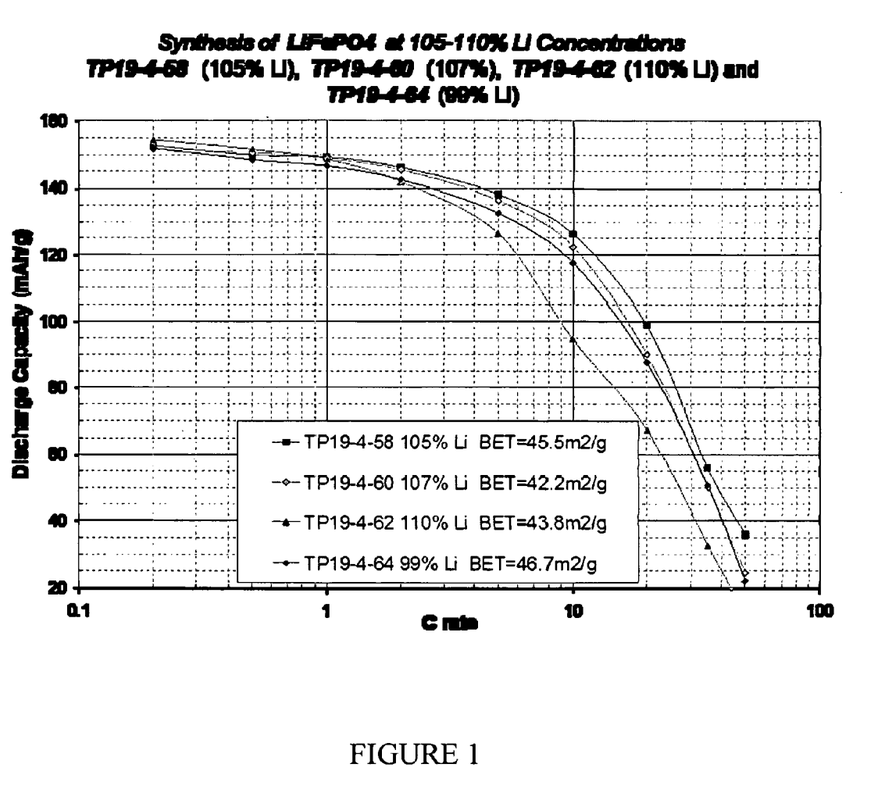
FIG. 1 is a plot of discharge capacity (mAh/g) vs. discharge rate (C) for lithium iron phosphate-based compositions having an excess of up to 10 mol % lithium.

The positive electrode and lithium foil as the negative electrode were cut to proper dimensions and interposed with a microporous polyolefin separator Celgard® 2500 (Celgard LLC) to form a Swagelok type half cell against lithium foil. First charge capacities (FCC's) along with capacity were measured at the rates: C/5, C/2, 1C, 2C, 5C, 10C, 20C, 35C and 50C. FIG. 1 is a plot of discharge capacity vs. C rate for cells including a positive electrode active material having a lithium electroactive metal phosphate containing 99% (+1% Nb), 105%, 107, and 110% of lithium needed to prepare a stoichiometric product. All cells demonstrated comparable discharge capacities at low rates, e.g., 0.1-1C. However at higher rates, e.g., 2-10C, cells prepared with 105% Li and 107% lithium demonstrated higher discharge capacities than the 99% Li material. In the case of the cells prepared using 105% Li, increased discharge capacities as compared to the 99% Li cell was observed up to 50C. Similar improved discharge rates over a wide range of discharge rates have been observed for cells using 103% Li cathode materials. In comparison, 110% Li cells performed no better, and at higher rates worse, than the 99% Li cells.

There does not appear to be a correlation with performance and surface area, suggesting that the improvements in capacity and rate are not attributable to a change in particle size of the electrode materials. Without being bound by any theory or mode of operation, the observed improvements in performance with higher lithium content may be attributable to a lithium containing secondary phase. In particular, it may be attributable to the presence of a conductive secondary phase, e.g., a lithium ion conductive phase.

EXAMPLE 2

Figure 2:
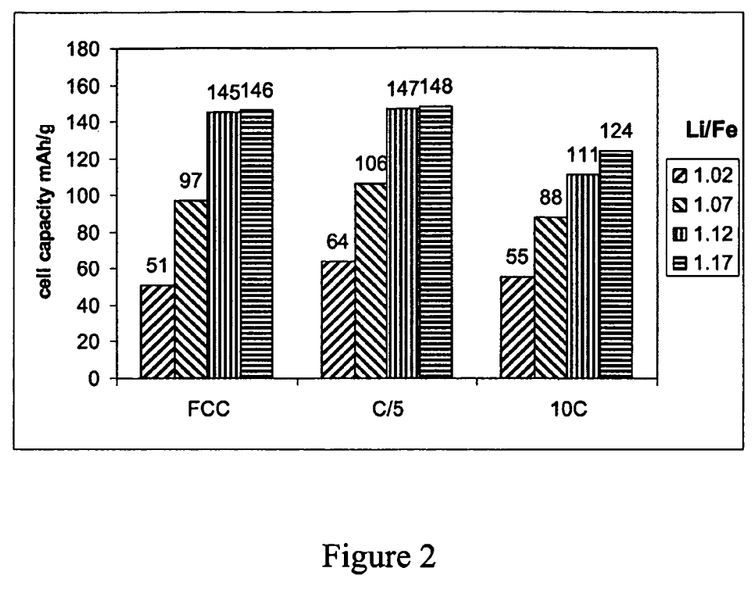
FIG. 2 is a bar graph illustrating lithium ion cell capacity under various charge and discharge conditions for $LiFePO_4$-based compositions having varying Li/Fe ratio; the P/Fe ratio is held constant at 1.064.
Figure 3:
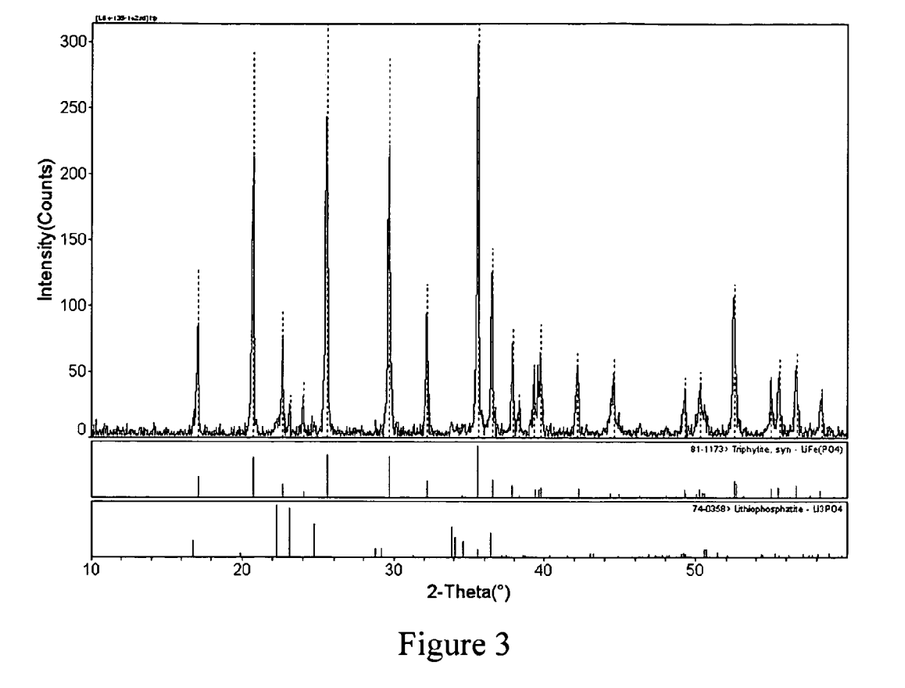
FIG. 3 is an X-ray diffraction (XRD) pattern for a composite cathode material according to one or more embodiments.

Preparation of a Lithium-ion Secondary Cell Having a Lithium and Phosphorus Rich Positive Electrode The composite cathodes synthesized, tested and reported in Table 1 and subsequent FIGS. 2-3 all were synthesized with the addition of doping transition metal; here vanadium was doped at a mole fraction of 2-5% (relative to iron) in the materials reported. Starting materials including iron phosphate dihydrate (ca. 95% based in ICP), lithium carbonate (>99%), vanadium oxide (>99.9%) and a vinyl-based copolymer were dispersed in isopropanol solvent (<0.3 wt % H$_2$O) to make a slurry that is 25-35 wt % solids. The slurry was then milled for 24-72 hrs with YSZ media (5-mm) and subsequently dried by evaporation of the alcohol solvent. The recovered dry powder was reacted under a flow of pure nitrogen or 5% H$_2$ (in N$_2$) to a final temperature of 650-700° C. The heating ramp was between 5-10° C./min and the product was held at the final temperature for 0-2 hrs.

The resulting powder was blended with 5 wt % acetylene black (HS-100) and 5 wt % vinylidene fluoride resin (Kureha) with equal weight of N-methyl-2-pyrrolidone and cast onto aluminum foil. The dried cathode had an active loading of 1-1.5 mAh/cm$^2$. Coin cells were assembled and tested with 1 cm disks of the cathode, with Celguard 2320 separator, pure lithium disk as anode and 1.3M LiPF$_5$ in 50:50 ethylene carbonate, dimethyl carbonate solvent.

Cathode materials were synthesized with a range of phosphate contents. Starting materials were used in the amounts appropriate to provide the desires proportion of lithium, iron and phosphate in the final product. Materials were selected to provide the target molar % of each metal in the final product based on ICP elemental analysis of each precursor. For a given P/Fe ratio (a measure of the amount of phosphate present above the stoichiometric ratio of 1.00), the lithium content was varied and the capacity at first charge and at discharge rates of C/5 and 10C were determined. The cathode performance (capacity) values are summarized in Table 1, along with the Li/Fe (mol/mol) ratio and Fe/P (mol/mol) ratio used in the synthesis of the electrode material. For each of the iron phosphate precursors, a selected Li/Fe/P formulation resulted in the optimal cathode capacity for the resulting product. Higher P/Fe ratios for the iron phosphate precursor required correspondingly more lithium to achieve the optimal cathode capacity. Thus, the optimal energy storage capacity of the cathode materials made from each unique iron phosphate precursor was found to be linked to the amount of lithium carbonate reagent added during the synthesis.

TABLE 1

Characterization of iron phosphate reagent material and the resulting cathode capacities for different Li/Fe ratio formulations.

| Sample # | P/Fe | Li/Fe | FCC* | C/5* | 10C* |
|---|---|---|---|---|---|
| 1 | 0.998 | 1.033 | 146 | 150 | 124 |
| 2 | 1.033 | 1 | 60 | 80 | 79 |
|   |   | 1.05 | 144 | 147 | 130 |
|   |   | 1.1 | 146 | 148 | 131 |
|   |   | 1.15 | 147 | 150 | 129 |
| 3 | 1.045 | 1 | 61 | 75 | 70 |
|   |   | 1.05 | 105 | 114 | 103 |
|   |   | 1.1 | 146 | 148 | 127 |
|   |   | 1.15 | 149 | 149 | 131 |
| 4 | 1.064 | 1.02 | 51 | 64 | 55 |
|   |   | 1.07 | 97 | 106 | 88 |
|   |   | 1.12 | 145 | 147 | 111 |
|   |   | 1.17 | 146 | 148 | 124 |
| 5 | 1.132 | 1.05 | 126 | 119 | 56 |
|   |   | 1.1 | 132 | 124 | 56 |
|   |   | 1.3 | 143 | 133 | 82 |

*Cathode specific capacities as mAhr/g. FCC is first charge capacity; C/5 is the discharge capacity at a rate of ⅕ the theoretical cell capacity per hour; 10C is discharge capacity at a rate of 10 times the theoretical cell capacity per hour.

The cathode capacities (mAh/g) are summarized for four different formulations (Li/Fe) for a representative iron phosphate precursor (Sample 4) in FIG. 2. In this example, the optimal cathode capacity at low rate (C/5) is at a Li/Fe ratio of >1.1, whereas an even higher Li content (Li/Fe 1.17) further improves the capacity at higher rate of discharge (10C). Thus, the increased lithium content provided improved performance under the more demanding 10C discharge, suggesting that the composition benefits from the presence of a lithium phosphate secondary phase.

The data also suggest that there may be an upper limit to the amount of lithium that can be added while still demonstrating improvements in performances. See for example the composite cathode reported in Table 1, synthesized with iron phosphate precursor Sample 7, which has the highest P/Fe reported here, and a Li/Fe ratio of 1.3 in the synthesis. In this formulation the calculated fraction of $Li_3PO_4$, based on a theoretical yield of lithium iron phosphate and $Li_3PO_4$ is ca. 15 wt %. Clearly the high rate capacity for this composite electrode material is not as good as that achieved with other iron phosphate precursors, which demonstrates there is a practical limitation of advantageous presence of the lithium phosphate secondary phase in the composite cathodes summarized in this invention.

Further analyses of the resulting cathode materials reveal that the samples containing the highest P/Fe and high Li/Fe ratios were comprised of a secondary phase. XRD analysis of the cathode samples shows the cathodes material is primarily of lithium iron phosphate, such as triphylite, but certain samples also reveal a small contribution (up to about 15 vol %) of lithium phosphate, $Li_3PO_4$, see FIG. 3. XRD analyses of all cathode materials where the Li/Fe and P/Fe ratios are greater than one do not reveal the existence of crystalline $Li_3PO_4$, however. It is well known that minor phase impurities are not always revealed by powder XRD analysis, and generally it is expected that impurities must comprise greater than 5 wt % of the total sample in order to be well characterized, even under long scan conditions. Generally cathode materials synthesized with Li/Fe and P/Fe ratios greater than one will be comprised of a composite of majority an olivine lithium iron phosphate-type phase and minor amount of lithium and phosphate rich phase. In some cases this second phase may contain crystalline $Li_3PO_4$ but amorphous phase are also contemplated. It is also assumed that under the present high-temperature solid-state reaction and a non-uniform distribution of reactants that the lithium iron phosphate and the lithium phosphate rich secondary phase may coexist even in formulations where the P/Fe and/or Li/Fe molar ratios may be less than one. Under non equilibrium conditions the fast crystallization kinetics of these two phases may compete for the limiting reagent (either P or Li) and some measurable quantity of the lithium phosphate rich secondary phase may be present. Further, under the reducing conditions necessary for the formation of these cathode materials it is envisioned that some of lithium rich phase may be reduced to include a lithium pyrophosphate, $Li_x(PO)_y$, phase, where $x \leq 3$ and $y \leq 4$, examples $Li_4(P_2O_7)$ or $Li_2(P_2O_6)$ and the lithium phosphate phase may be partially crystalline or amorphous.

The presence of a secondary lithium rich and phosphate rich phase in the composite cathode materials was also confirmed by elemental analysis. ICP-AES was performed on several composite materials to confirm the Li/Fe and P/Fe ratios of the synthesized products were consistent with the stoichiometries calculated for the starting synthesis mixtures. Several of these materials were also rinsed with cold deionized water. The rinse water and the resulting washed products were subsequently analyzed by ICP-AES. It was found that in every sample a small amount of lithium and phosphorus were detected in the rinse water (but little to no iron) and the Li/Fe and P/Fe ratios of the washed products were lower than the un-washed materials. The stoichiometry of the lithium and phosphorus in the rinse water was approximately 3 for all—samples analyzed by washing. This is consistent with the negligible solubility of the crystalline olivine lattice and the sparing but measurable solubility of $Li_3PO_4$ in cold water.

Additionally, while the composite materials synthesized, tested and reported in Table 1 and subsequent figures are based on lithium iron phosphate, it is imagined that the secondary lithium and phosphate rich phase would similarly benefit other phosphate based electrode materials, included but not limited to other olivine compounds where the transition metal includes one or more of the following, Cr, Mn, Fe, Co, and Ni that may be optionally doped with up to about 10 mol % of V, Nb, Ti, Al, Mn, Co, Ni, Mg, and/or Zr. Also the secondary lithium and phosphate rich would similarly benefit other phosphate based electrode materials, included but not limited to $A_3M_2(PO_4)_3$ materials referred to as NaSICON type materials, e.g. $Li_3V_2(PO_4)_3$ and others.

EXAMPLE 3

Preparation of Lithium-ion Secondary Cell Having Undoped Olivine Cathode Material Additional cathode materials were synthesized without the addition of a doping element that also demonstrated a benefit of increased lithium storage capacity when the material contains an excess of Li and phosphorus, i.e. Li/Fe molar ratio is greater than one and P/Fe molar ratio is greater than 1. Materials were synthesized as described in Example 2, where the iron and phosphate source was a crystalline ferric phosphate dihydrate (purity ca 95-wt %) and the lithium source was lithium carbonate (>99-wt % purity) and a vinyl-based copolymer dispersed in isopropanol solvent (<0.3 wt % $H_2O$). The slurry was milled, dried and reacted at high temperature as described in Example 2.

When the resulting nanophosphate cathode material was tested in a lithium battery cell (as described in Example 2) the resulting specific capacity of the cathode powder showed a benefit for materials synthesized with higher lithium contents. When the phosphate to iron ratio was 1.02 and the lithium to iron molar ratio in the synthesis mixture was between 0.98 and 1.00 the reversible capacity of the resulting cathode powder was between 135-140 mAhr/g at a low discharge rate of C/5. At the same phosphate to iron ratio of 1.02 but increased lithium to iron molar ratio of 1.05-1.06, the reversible capacity of the resulting cathode powder was between 145-150 mAhr/g at the same slow discharge rate.

EXAMPLE 4

Preparation of Lithium-ion Secondary Cell Having Titanium-doped Olivine Cathode Material In another aspect of the invention cathode materials were synthesized, as described in Example 2, but with titanium as a dopant instead of vanadium. Materials were synthesized where the iron and phosphate source was crystalline ferric phosphate dehydrate (purity ca 95-wt %) and the lithium source was lithium carbonate and a vinyl-based copolymer was dispersed in isopropanol solvent (0.3 wt % H2O). Titanium was added to give a molar ratio of Ti/Fe between 0.025 and 0.05 in the synthesis mixture, where titanium was in the form of titanium tetraisopropoxide (99-wt % purity) or as titanium dioxide (99-wt % purity). The synthesis mixture was milled, dried and reacted at high temperature as described for example 2.

When the nanophosphate cathode material was tested in a lithium battery cell (as described in example 2) the resulting specific capacity of the cathode powder showed a benefit for materials with excess lithium and excess phosphate compared to the content of iron (i.e. Li/Fe>1 and P/Fe>1. One such titanium doped olivine material prepared with a titanium to iron molar ratio of 0.05 and a lithium to iron molar ratio between 1.02 and 1.00 and a phosphate to iron ratio of 1.02 demonstrated a reversible lithium storage capacity of ca 110 mAhr/g at a discharge rate of 10C. By comparison, another titanium doped olivine material was synthesized with the same Ti/Fe=0.05 and P/Fe=1.02, but an increased lithium content of Li/Fe=1.05-1.06 demonstrated a reversible lithium storage capacity of 130 mAhr/g at the same discharge rate.

Upon review of the description and embodiments described above, those skilled in the art will understand that modifications and equivalent substitutions may be performed in carrying out the invention without departing from the essence of the invention. Thus, the invention is not meant to be limiting by the embodiments described explicitly above.

What is claimed is:

1. A positive electrode material having an improved charge capacity at high discharge rates, the positive electrode material comprising:

an electroactive material having two or more phases comprising lithium (Li), an electroactive metal (M), and phosphate ($PO_4$), wherein the overall composition of the electroactive material has a ratio of Li:M ranging from greater than 1.1 to about 1.3, a ratio of ($PO_4$):M ranging from about 1.0 to about 1.14, the ratios Li:M and ($PO_4$):M are as compared to a stoichiometric composition for an olivine lithium transition metal phosphate ($LiMPO_4$), M is one or more metals selected from the group consisting of Cr, Mn, Fe, Co, and Ni, and wherein the electroactive material comprises an olivine lithium electroactive metal phosphate phase and less than 10 wt % of a lithium-rich secondary phase or a lithium-rich and phosphate-rich secondary phase.

2. The positive electrode material of claim 1, wherein the electroactive material further comprises one or more dopant metals (Z) selected from the group consisting of V, Nb, Ti, Al, Mg, Mn, Co, Ni, and Zr, wherein M and Z are different.

3. The positive electrode material of claim 2, wherein
M comprises Fe,
the ratio of Li:M ranges from greater than 1.1 to about 1.15,
the ratio of ($PO_4$):M ranges from about 1.0 to about 1.03, and
the electroactive material comprises up to 5 mol % of the one or more dopant metals.

4. The positive electrode material of claim 2, wherein
M comprises Fe,
the ratio of Li:M ranges from greater than 1.1 to about 1.15,
the ratio of ($PO_4$):M ranges from about 1.03 to about 1.05, and
the electroactive material comprises up to 5 mol % of the one or more dopant metals.

5. The positive electrode material of claim 2, wherein
M comprises Fe,
the ratio of Li:M ranges from greater than 1.1 to about 1.2,
the ratio of ($PO_4$):M ranges from about 1.05 to about 1.07, and
the electroactive material comprises up to 5 mol % of the one or more dopant metals.

6. The positive electrode material of claim 2, wherein
M comprises Fe,
the ratio of Li:M ranges from greater than 1.1 to about 1.3,
the ratio of ($PO_4$):M ranges from about 1.07 to about 1.14, and
the electroactive material comprises up to 5 mol % of the one or more dopant metals.

7. The positive electrode material of claim 2, wherein the one or more dopant metals substitutes one or more of the lithium or electroactive metals in the olivine lithium electroactive metal phosphate.

8. The positive electrode material of claim 2, wherein the olivine lithium electroactive metal phosphate has the formula $(Li_{1-x},Z_x)MPO_4$, x ranges from about 0.001 to about 0.05, and the ratio of $(Li_{1-x},Z_x)$:M in the overall composition of the electroactive material ranges from greater than 1.1 to about 1.3.

9. The positive electrode material of claim 1, wherein the electroactive material comprises the olivine lithium electroactive metal phosphate phase and lithium-rich and phosphate rich secondary phase.

10. The positive electrode material of claim 9, wherein the secondary phase comprises lithium phosphate or lithium pyrophosphate.

11. A lithium secondary cell, comprising:
a positive electrode in electronic contact with a positive electrode current collector, said current collector in electrical connection with an external circuit;
a negative electrode in electronic contact with a negative electrode current collector, said current collector in electrical connection with an external circuit;
a separator positioned between and in ionic contact with the cathode and the anode; and an electrolyte in ionic contact with the positive and negative electrodes; wherein
the positive electrode comprises an electroactive material having two or more phases comprising lithium (Li), an electroactive metal (M), and phosphate ($PO_4$), wherein the overall composition in the electroactive material has a ratio of Li:M ranging from greater than 1.1 to about 1.3, a ratio of ($PO_4$):M ranging from about 1.0 to about 1.14, the ratios Li:M and ($PO_4$):M are as compared to a stoichiometric composition for an olivine lithium transition metal phosphate ($LiMPO_4$), M is one or more metals selected from the group consisting of Cr, Mn, Fe, Co, and Ni, and wherein the electroactive material comprises an olivine lithium electroactive metal phosphate phase and less than 10 wt % of a lithium-rich secondary phase or a lithium-rich and phosphate-rich secondary phase.

12. The lithium secondary cell of claim 11, wherein the electroactive material further comprises one or more dopant metals (Z) selected from the group consisting of V, Nb, Ti, Al, Mg, Mn, Co, Ni, and Zr, wherein M and Z are different.

13. The lithium secondary cell of claim 12, wherein the electroactive material comprises up to about 5 mol % of the one or more dopant metals.

14. The lithium secondary cell of claim 12, wherein the one or more dopant metals substitutes one or more of the lithium or electroactive metals in the olivine lithium electroactive metal phosphate.

15. The lithium secondary cell of claim 12, wherein the olivine lithium electroactive metal phosphate has the formula ($Li_{1-x}Z_x$)$MPO_4$, x ranges from about 0.001 to about 0.05, and the ratio of ($Li_{1-x}Z_x$):M in the overall electroactive material ranges from greater than 1.1 to about 1.3.

16. The lithium secondary cell of claim 11, wherein the electroactive material comprises the olivine lithium electroactive metal phosphate phase and lithium-rich and phosphate rich secondary phase.

17. The lithium secondary cell of claim 11, wherein the negative electrode comprises a lithium intercalation compound or a lithium metal alloy.

18. The lithium secondary cell of claim 11, the negative electrode comprises carbon.

19. The lithium secondary cell of claim 18, wherein the negative electrode comprises graphitic carbon.

20. The lithium secondary cell of claim 18, wherein the carbon is selected from the group consisting of graphite, spheroidal graphite, mesocarbon microbeads and carbon fibers.

21. A positive electrode comprising the positive electrode material of claim 1.

22. The positive electrode of claim 21, wherein the electroactive material further comprises one or more dopant metals (Z) selected from the group consisting of V, Nb, Ti, Al, Mg, Mn, Co, Ni, and Zr, wherein M and Z are different.

23. The positive electrode of claim 22, wherein the electroactive material comprises up to about 5 mol % of the one or more dopant metals.

24. The positive electrode of claim 22, wherein the one or more dopant metals substitutes one or more of the lithium or electroactive metals in the olivine lithium electroactive metal phosphate.

25. The positive electrode of claim 22, wherein the olivine lithium electroactive metal phosphate has the formula ($Li_{1-x}Z_x$)$MPO_4$, x ranges from about 0.001 to about 0.05, and the ratio of ($Li_{1-x}Z_x$):M in the overall electroactive material ranges from greater than 1.1 to about 1.3.

26. The positive electrode of claim 21, wherein the electroactive material comprises the olivine lithium electroactive metal phosphate phase and lithium-rich and phosphate rich secondary phase.

27. The positive electrode of claim 21, further comprising a binder and an electronically conductive material.

* * * * *